United States Patent
Lindoff et al.

(10) Patent No.: US 10,064,124 B2
(45) Date of Patent: Aug. 28, 2018

(54) COMMUNICATION DEVICE, NETWORK NODE, AND COMPUTER PROGRAM FOR COMMUNICATION AND/OR DEVICE-TO-DEVICE OPERATION IN AN OUT OF COVERAGE STATE

(71) Applicant: Telefonaktiebolaget LM Ericsson (publ), Stockholm (SE)

(72) Inventors: Bengt Lindoff, Bjärred (SE); Muhammad Kazmi, Bromma (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 108 days.

(21) Appl. No.: 14/915,829

(22) PCT Filed: Feb. 5, 2016

(86) PCT No.: PCT/EP2016/052526
§ 371 (c)(1),
(2) Date: Mar. 1, 2016

(87) PCT Pub. No.: WO2016/124750
PCT Pub. Date: Aug. 11, 2016

(65) Prior Publication Data
US 2016/0360475 A1    Dec. 8, 2016

Related U.S. Application Data

(60) Provisional application No. 62/113,146, filed on Feb. 6, 2015.

(51) Int. Cl.
*H04W 48/16* (2009.01)
*H04W 72/08* (2009.01)
(Continued)

(52) U.S. Cl.
CPC .......... *H04W 48/16* (2013.01); *H04W 4/80* (2018.02); *H04W 72/085* (2013.01);
(Continued)

(58) Field of Classification Search
CPC ... H04W 48/16; H04W 4/008; H04W 72/085; H04W 76/023; H04W 76/046; H04W 76/048
See application file for complete search history.

(56) References Cited

U.S. PATENT DOCUMENTS 9,622,158 B2 *   4/2017   Lunden ................ H04W 48/16
9,699,749 B2     7/2017   Chae et al.
(Continued)

FOREIGN PATENT DOCUMENTS

| WO | 2013130052 A1 | 9/2013 |
| WO | 2014045832 A1 | 3/2014 |
| WO | 2015063185 A1 | 5/2015 |

OTHER PUBLICATIONS

International Search Report and Written Opinion dated May 25, 2016 for PCT International Application Serial No. PCT/EP2016/052526, International Filing Date—Feb. 5, 2016 consisting of 14-pages.
(Continued)

*Primary Examiner* — Chi H Pham
*Assistant Examiner* — Weibin Huang
(74) *Attorney, Agent, or Firm* — Christopher & Weisberg, P.A.

(57) ABSTRACT

A method of a communication device configured for cellular communication and device-to-device, D2D, operation and operating in an out-of-coverage, OoC, state is disclosed. The method comprises determining whether a D2D operation is ongoing or imminent, performing cell search according to a first rate when no D2D operation is ongoing or imminent,
(Continued)

and performing cell search according to a second rate when D2D operation is ongoing or imminent. A method is also disclosed where it is determined whether the communication device is in one of an OoC and IC state, and a cell search is adapted accordingly. A communication device and a network node, a method for a network node, and computer programs are also disclosed.

44 Claims, 4 Drawing Sheets

(51) Int. Cl.
*H04W 4/80* (2018.01)
*H04W 76/27* (2018.01)
*H04W 76/14* (2018.01)
*H04W 76/28* (2018.01)
*H04W 8/00* (2009.01)

(52) U.S. Cl.
CPC ........... *H04W 76/14* (2018.02); *H04W 76/27* (2018.02); *H04W 76/28* (2018.02); *H04W 8/005* (2013.01)

(56) References Cited

U.S. PATENT DOCUMENTS

| | | | |
|---|---|---|---|
| 9,788,355 B2* | 10/2017 | Sharma | H04W 48/16 |
| 2010/0135176 A1 | 6/2010 | Kazmi et al. | |
| 2013/0114531 A1 | 5/2013 | Ahn et al. | |
| 2013/0223356 A1 | 8/2013 | Khoshnevis et al. | |
| 2014/0328329 A1 | 11/2014 | Novlan et al. | |
| 2015/0043448 A1 | 2/2015 | Chatterjee et al. | |
| 2015/0117375 A1* | 4/2015 | Sartori | H04W 56/001 |
| | | | 370/329 |
| 2015/0271856 A1 | 9/2015 | Tong et al. | |
| 2015/0327240 A1* | 11/2015 | Yamada | H04W 72/02 |
| | | | 455/426.1 |
| 2015/0358894 A1* | 12/2015 | Berggren | H04W 76/14 |
| | | | 455/434 |
| 2016/0262142 A1 | 9/2016 | Nagata et al. | |
| 2016/0316487 A1 | 10/2016 | Kalhan et al. | |

OTHER PUBLICATIONS

3GPP TSG-RAN WG1, R1-060105, Agenda item: 5.1.3.4, Source: Ericsson, Title: "E-UTRA Cell Search", Document for Discussion and Decision, Conference Location and Date: Helsinki, Finland, Jan. 23-25, 2006 consisting of 7-pages.

3GPP TS 36.300 V11.2.0 (Jun. 2012) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11) Jul. 2, 2012 consisting of 201-pages.

3GPP TS 23.303 V12.3.0 (Dec. 2014) 3rd Generation Partnership Project; Technical Specification Group Services and System Aspects; Proximity-based services (ProSe); Stage 2 (Release 12) Dec. 17, 2014 consisting of 62-pages.

3GPP TSG-RAN WG4 #74 R4-151126, Source: Ericsson, Qualcomm Incorporated Title: "RRM requirements for ProSe", Conference Location and Date: Athens, Greece, Feb. 9-13, 2015 consisting of 28-pages.

Office Action dated Oct. 5, 2017 in related U.S. Appl. No. 15/031,038 consisting of 7-pages.

3GPP_3GPP TR 22.803 V12.2.0 (Jun. 2013) 3rd Generation Partnership Project; Technical Specification Group Services and System Aspects; Feasibility study for Proximity Services (ProSe) (Release 12) Mar. 14, 2012 consisting of 45-pages.

3GPP TSG-RAN WG1 Meeting #74, R1-133496, Agenda item: 7.2.8.1, Source: Nokia, NSN, Title: D2D Synchronization—Out of Network Coverage/Partial Network Coverage:, Document for Discussion and Decision, Conference Location and Date: Barcelona, Spain, Aug. 23, 2013 consisting of 2-pages.

International Search Report and Written Opinion dated Apr. 16, 2015 for related (not parent) PCT International Application Serial No. PCT/EP2014/073266, International Filing Datet—Oct. 29, 2014 consisting of 13-pages.

* cited by examiner

COMMUNICATION DEVICE, NETWORK NODE, AND COMPUTER PROGRAM FOR COMMUNICATION AND/OR DEVICE-TO-DEVICE OPERATION IN AN OUT OF COVERAGE STATE

TECHNICAL FIELD

The present invention generally relates to a method of a communication device enabled for cellular communication and device-to-device (D2D) communication. The present invention further relates to a method of a network node, computer programs, a communication device and a network node.

Abbreviations

Below are explanations of some of the abbreviations that may occur in this disclosure. Other abbreviations are explained in connection with their use in the text.

| Abbreviation | Explanation |
| --- | --- |
| 3GPP | Third generation partnership program |
| AP | Access point |
| BLER | Block error rate |
| BS | Base station |
| BSC | Base station controller |
| BTS | Base transceiver station |
| CGI | Cell global identity |
| CSI | Channel state information |
| DAS | Distributed antenna system |
| DL | Downlink |
| DRX | Discontinuous reception |
| eNodeB | Evolved NodeB |
| FDD | Frequency division duplex |
| LTE | Long term evolution |
| M2M | machine to machine |
| MCG | Master cell group |
| MDT | Minimization of drive tests |
| MeNB | Master eNode B |
| MME | Mobility management entity |
| MSR | Multi-standard radio |
| PCI | Physical cell identity |
| PCell | Primary Cell |
| PSS | Primary synchronization signal |
| RAT | Radio Access Technology |
| RX | Receiver |
| RLM | Radio link monitoring |
| RNC | Radio Network Controller |
| RRC | Radio resource control |
| RRH | Remote radio head |
| RRU | Remote radio unit |
| RSRP | Reference Signal Received Power |
| RSRQ | Reference Signal Received Quality |
| RSSI | Received signal strength indication |
| RSTD | Reference signal time difference |
| RX | Receiver |
| SCell | Secondary Cell |
| SCG | Secondary Cell Group |
| SeNB | Secondary eNode B |
| SINR | Signal to interference and noise ratio |
| SNR | Signal to noise ratio |
| SON | Self-organizing networks |
| SSS | Secondary synchronization signal |
| TA | Timing advance |
| TDD | Time division duplex |
| TX | Transmitter |
| UE | User equipment |
| UL | Uplink |

BACKGROUND

Radio measurements done by a communication device, such as a user equipment (UE), are typically performed on the serving as well as on neighbour cells over some known reference symbols or pilot sequences. The measurements are done on cells on an intra-frequency carrier, inter-frequency carrier(s) as well as on inter-RAT carriers(s) (depending upon the UE capability whether it supports that RAT). To enable inter-frequency and inter-RAT measurements the network configures measurement gaps for the UE, which gaps may comprise time/frequency where the serving cell performs no or limited transmissions (e.g. almost blank subframes).

The measurements are done for various purposes. Some example measurement purposes are to support in: mobility, positioning, self-organizing networks (SON), minimization of drive tests (MDT), operation and maintenance (O&M), network planning and optimization etc. Examples of measurements in 3GPP Long Term Evolution (LTE) are: Cell identification (which is also referred to as PCI acquisition), RSRP, RSRQ, CGI acquisition, RSTD, UE RX-TX time difference measurement, RLM, which comprises Out of synchronization (out of sync) detection and In synchronization (in-sync) detection etc. Channel State Information (CSI) measurements performed by the UE are used for scheduling, link adaptation etc. by network. Examples of CSI measurements or CSI reports are Channel Quality Indicator (CQI), Precoding Matrix Indicator (PMI), Rank Indicator (RI), etc. They may be performed on reference signals like Cell-specific Reference Signal (CRS), CSI Reference Signal (CSI-RS) or Demodulation Reference Signal (DMRS).

In order to support different functions such as mobility (e.g. cell selection, cell re-selection, handover, etc.), positioning a UE, link adaption, scheduling, load balancing, admission control, interference management, interference mitigation etc., the radio network node, such as an eNode B, also performs radio measurements on signals transmitted and/or received by the radio network node. Examples of such measurements are SNR, SINR, received interference power (RIP), BLER, propagation delay between UE and itself, transmit carrier power, transmit power of specific signals (e.g. TX power of reference signals), positioning measurements like TA, eNode B RX-TX time difference etc.

For example in 3GPP LTE, the DL subframe #0 and subframe #5 carry synchronization signals (i.e. both PSS and SSS). In order to identify an unknown cell (e.g. new neighbour cell) the UE has to acquire the timing of that cell and eventually the physical cell ID (PCI). Subsequently the UE also measures RSRP and/or RSRQ of the newly identified cell in order to use itself and/or report the measurement to the network node. In total there are 504 PCIs in 3GPP LTE.

The UE searches or identifies a cell (i.e. acquires PCI of the cell) by correlating the received PSS/SSS signals in DL subframe #0 and/or in DL subframe #5 with one or more of the pre-defined PSS/SSS sequences e.g. combination of PSS and SSS sequences leading to up to 504 cell identities in LTE. The use of subframe #0 and/or in DL subframe #5 for PCI acquisition depends upon the UE implementation. The UE may further correlate over cell specific reference signals with the pre-defined CRS sequence(s) after the detection of PSS/SSS. The UE regularly attempts to identify neighbour cells on at least the serving carrier frequency(-ies). But it may also search cells on non-serving carrier(s) when configured by the network node. In order to save UE power consumption, the UE typically searches in one of the DL subframes #0 and #5. In order to further save its battery power the UE may search the cell once every 40 ms in a non-DRX or in a short DRX cycle (e.g. up to 40 ms). For longer DRX cycles the UE typically searches a cell once every DRX cycle. During each cell search attempt the UE typically stores a snapshot of 5-6 ms and post-processes this by correlating the stored signals with the known PSS/SSS sequences. In non-DRX the UE is able to identify an intra-frequency cell (including RSRS/RSRQ measurements) within 800 ms (i.e. 20 attempts in total including 15 and 5 samples for cell identification (PCI acquisition) and RSRP/RSRQ measurement).

In device-to-device (D2D) communication, the UEs transmit D2D signals or channels in the uplink part of the spectrum. i.e. either UL resources in TDD or on the UL carrier in FDD. D2D operation by a UE is using a half-duplex mode, i.e. the UE can either transmit D2D signals/channels or receive D2D signals/channels. There may also be D2D UEs, acting as relay nodes, which may relay some signals to other D2D UEs. There is also control information for D2D, some of which are transmitted by D2D UEs and others transmitted by eNodeBs (e.g., D2D resource grants for D2D communication transmitted via cellular DL control channels). The D2D transmissions may occur on resources which are configured by the network or selected autonomously by the D2D UE.

D2D communication implies transmitting, by a D2D transmitter, D2D data and D2D communication control information with scheduling assignments (SAs) to assist D2D receivers of the D2D data. The D2D data transmissions are transmitted according to configured patterns, which may be defined by time and/or frequency, and in principle may be transmitted rather frequently. SAs are transmitted periodically. D2D devices that are within the network coverage may request network node (e.g. eNodeB) resources for their D2D communication transmissions and in response, receive D2D resource grants for SA and D2D data. Furthermore, the network node (e.g. eNodeB) may broadcast D2D resource pools, i.e. the time/frequency assignments in response to the resource requests, for D2D communication.

D2D discovery messages are transmitted in infrequent periodic subframes. Network nodes (e.g. eNodeBs) may broadcast D2D resource pools for D2D discovery, both for reception and transmission. The D2D communication supports two different modes of D2D operation: mode 1 and mode 2. In mode 1, the location of the resources for transmission of the scheduling assignment by the broadcasting wireless device (e.g UE) comes from the network node (e.g. eNodeB). The location of the resource(s) for transmission of the D2D data by the broadcasting UE comes from the eNodeB. In mode 2 a resource pool for scheduling assignment is pre-configured and/or semi-statically allocated. The UE on its own selects the resource for scheduling assignment from the resource pool for scheduling assignment to transmit its scheduling assignment.

PCell interruption of one subframe occurs when the UE switches its reception from D2D to Wide Area Network (WAN) or from WAN to D2D. This is because the UE receiver chain needs to be retuned every time the operation is switched from WAN to D2D reception and from D2D to WAN reception. This applies to both D2D discovery and D2D communication capable UEs. It is important to partition uplink resources between cellular uplink and D2D operation in such a way that avoids or minimize the risk of switching taking place in certain subframes, i.e. subframe #0 and/or #5, of the PCell. These subframes contain essential information, such as PSS/SSS that are necessary for doing cell search, carrying out cell measurements and they also contain Master Information Block/System Information Block (MIB/SIBI) information which is necessary for System Information (SI) reading procedures. In addition to the interruption that takes places due to switching, there may be additional interruption of one subframe due to the RRC reconfiguration procedure. While the switching interruption takes place for UE with a single receiver (RX) (e.g. D2D discovery capable UEs), the RRC reconfiguration interruption takes place for all types of D2D UEs (e.g. D2D Discovery capable and D2D Communication capable UEs). Here, D2D Discovery concerns the ability of devices to discover other devices in their vicinity. The discovery may be network centric or device centric. The purpose of the discovery may be to establish D2D communication or merely to provide information to application layer, for example for a social networking application, that another device is in vicinity. The D2D Communication capability concerns the capability to exchange data directly between devices without going via a network node.

D2D operation is a generic term which may comprise of transmission and/or reception of any type of D2D signals (e.g. physical signals, physical channels etc.) by a D2D communication capable UE and/or by D2D discovery capable UE. D2D operation is therefore also called D2D transmission, D2D reception, D2D communication etc.

A D2D UE is also interchangeably called a Proximity Service (ProSe) capable UE. D2D discovery capable UE is also referred to as UE capable of ProSe direct discovery, and D2D (direct) communication capable UE is also referred to as a UE capable of ProSe direct communication. The radio link and radio carrier that is used for the ProSe direct communication and ProSe direct discovery between UEs is referred to as side link.

SUMMARY

The present disclosure is based on the realization that adapting the cell search scheme when a communication device is out of network coverage may save power in communication devices.

According to a first aspect, there is provided a method of a communication device enabled for cellular communication and device-to-device, D2D, communication and operating in an out-of-coverage, OoC, state. The method comprises determining whether a D2D operation is ongoing or imminent, performing cell search according to a first rate when no D2D operation is ongoing or imminent, and performing cell search according to a second rate when D2D operation is ongoing or imminent.

The first rate and the second rate may define how often information about a cell to be searched should be received and processed by the communication device.

The relation between the first rate and the second rate may be such that the second rate is higher than the first rate by a scaling factor.

The first rate may correspond to that the communication device identifies a cell within a first time period and the second rate may correspond to that the communication device identifies a cell within a second time period, where the first time period may be larger than the second time period. A time period where the communication device identifies the cell within the first or second time period may be defined as a cell identification delay.

The first rate and the second rate may be used to search a cell within a time duration equal to a first cell identification delay and a second cell identification delay, respectively.

The method may comprise, upon determining that the D2D operation is ongoing, determining when the D2D operation stops, starting a timer, and when the timer having elapsed, returning to the determining whether a D2D operation is ongoing or imminent.

The second rate may correspond to any of a cell search rate used in an in-coverage, IC, state, a discontinuous reception, DRX, cycle, and a rate preconfigured by the radio access network.

The out of coverage state may comprise 'any cell selection state'. The 'any cell selection state' may be a type of radio resource control (RRC) state where the communication device is preconfigurable to perform D2D operation on a side link of a preconfigured carrier.

The D2D operation may be any one or more of D2D transmission, D2D reception. Proximity service (ProSe) direct communication, and ProSe direct discovery.

According to a second aspect, there is provided a communication device for operating with a cellular radio access network and enabled for device-to-device communication. The communication device comprises a receiver arranged to receive at least one signal from a controlling node of the cellular radio access network for performing cell search, and a controller arranged to, when the communication device is in an out-of-coverage, OoC, state with relation to the controlling node, assign a scheme for the cell searching such that the communication device is arranged to perform cell search according to a cell search scheme where the controller is arranged to determine whether a D2D operation is ongoing or imminent, wherein the communication device is arranged to perform the cell search at a first rate when no D2D operation is ongoing or imminent, and to perform the cell search at a second rate when D2D operation is ongoing or imminent.

The first rate and the second rate may define how often information about the cell should be received and processed.

The relation between the first rate and the second rate may be such that the second rate is higher than the first rate by a scaling factor.

The first rate may correspond to that the communication device identifies a cell within a first time period and the second rate may correspond to that the communication device identifies a cell within a second time period, where the first time period may be larger than the second time period. A time period where the communication device identifies the cell within the first or second time period may be defined as a cell identification delay.

The first rate and the second rate may be used to search a cell within a time duration equal to a first cell identification delay and a second cell identification delay, respectively.

The controller may be arranged to, upon determination that the D2D operation is ongoing, determine when the D2D operation stops, start a timer, and when the timer having elapsed, return to the determination whether a D2D operation is ongoing or imminent.

The second rate may correspond to any of a cell search rate used in an in-coverage, IC, state, a discontinuous reception (DRX) cycle, and a rate preconfigured by the radio access network.

The out of coverage state may comprise 'any cell selection state'. The 'any cell selection state' may be a type of radio resource control (RRC) state where the communication device is preconfigurable to perform D2D operation on a side link of a preconfigured carrier.

The D2D operation may be any one or more of D2D transmission, D2D reception, Proximity service (ProSe) direct communication, and ProSe direct discovery.

According to a third aspect, there is provided a computer program comprising instructions which, when executed by a processor of a communication apparatus, causes the communication apparatus to perform the method according to the first aspect.

According to a fourth aspect, there is provided a method of a communication device enabled for cellular communication and device-to-device (D2D) communication. The method comprises determining, at the communication device, whether the communication device is in an out-of-coverage (OoC) state or in-coverage (IC) state with relation to a cellular radio access network, performing cell search, when the communication device is in the IC state, according to a first cell search scheme, and performing cell search, when the communication device is in the OoC state, according to a second cell search scheme.

The second cell search scheme may include determining whether a D2D operation is ongoing or imminent, performing the cell search at a first rate when no D2D operation is ongoing or imminent, and performing the cell search at a second rate when D2D operation is ongoing or imminent. The first rate and the second rate may define how often information about a cell to be searched should be received and processed by the communication device. The first rate may correspond to that the communication device identifies a cell within a first time period and the second rate may correspond to that the communication device identifies a cell within a second time period, where the first time period may be larger than the second time period. A time period where the communication device identifies the cell within the first or second time period may be defined as a cell identification delay.

The first rate and the second rate may be used to search a cell within a time duration equal to a first cell identification delay and a second cell identification delay respectively.

The method may further comprise, when it has been determined that D2D operation is ongoing, determining when the D2D operation stops, and then starting a timer, and when the timer has elapsed, returning to the determining whether a D2D operation is ongoing or imminent.

The relation between the first rate and the second rate may be such that the second rate is higher than the first rate by a scaling factor. The scaling factor may be given by a function defining how a kind or type of D2D operation activity of the ongoing or imminent D2D operation is assigned in relation to that kind or type. The function may for example be a mapping. The function may be such that, when the kind or type of D2D operation activity of the ongoing or imminent D2D operation is a discovery signalling, the scaling factor is based on a periodicity of the discovery signalling.

The method may comprise receiving information about the scaling factor from the radio access network.

The second rate may correspond to any of a cell search rate used in the IC state, a discontinuous reception, DRX, cycle, and a rate preconfigured by the radio access network.

The out of coverage state may comprise 'any cell selection state'. Here, the 'any cell selection state' is a term meaning that the communication device has not found any acceptable cell, as for example discussed in 3GPP TS 36.304 specification, version 8.10.0, section 5.2.8 and in Figure 5.2.2-1. The 'any cell selection state' may be a type of radio resource control (RRC) state where the communication device is preconfigurable to perform D2D operation on a side link of a preconfigured carrier.

The D2D operation may be any one or more of D2D transmission, D2D reception, Proximity service (ProSe) direct communication, and ProSe direct discovery.

The determining at the communication device whether the communication device is in OoC state or IC state in relation to the cellular radio access network may comprise determining a physical layer metric based on at least one received signal from the controlling node of the cellular radio access network, and determining whether the cellular communication device is in coverage or out of coverage of the controlling node based on the physical layer metric.

The first cell search scheme may comprise performing a cell search attempt at least one time per 100 ms.

According to a fifth aspect, there is provided a communication device for operating with a cellular radio access network and enabled for device-to-device communication. The communication device comprises a receiver arranged to receive at least one signal from a controlling node of the cellular radio access network for performing cell search, and a controller arranged to determine whether the communication device is in an out-of-coverage (OoC) state or in-coverage (IC) state with relation to the controlling node and assign a scheme for the cell searching such that the communication device is arranged to perform cell search, when the communication device is in the IC state, according to a first cell search scheme, and to perform cell search, when the communication device is in the OoC state, according to a second cell search scheme.

The controller may be arranged to, upon the second cell search scheme, determine whether a D2D operation is ongoing or imminent, wherein the communication device may be arranged to perform the cell search at a first rate when no D2D operation is ongoing or imminent, and to perform the cell search at a second rate when D2D operation is ongoing or imminent. The first rate and the second rate may define how often information about the cell should be received and processed. The first rate may correspond to that the communication device identifies a cell within a first time period and the second rate may correspond to that the communication device identifies a cell within a second time period, where the first time period may be larger than the second time period. A time period where the communication device identifies the cell within the first or second time period may be defined as a cell identification delay.

The first rate and the second rate may be configured to be used to search a cell within a time duration equal to a first cell identification delay and a second cell identification delay, respectively.

The controller may be arranged to, upon determination that the D2D operation is ongoing, determine when the D2D operation stops, start a timer, and, when the timer has elapsed, repeat the determination whether a D2D operation is ongoing or imminent.

The relation between the first rate and the second rate may be such that the second rate is higher than the first rate by a scaling factor.

The controller may be arranged to determine whether the communication device is in the OoC state or IC state in relation to the cellular radio access network by being arranged to determine a physical layer metric based on at least one received signal from the controlling node of the cellular radio access network, and determine whether the cellular communication device is in coverage or out of coverage of the controlling node based on the physical layer metric.

The first cell search scheme may comprise performing a cell search attempt at least one time per 100 ms.

According to a sixth aspect, there is provided a computer program comprising instructions which, when executed by a processor of a communication apparatus, causes the communication apparatus to perform the method according to the fourth aspect.

According to a seventh aspect, there is provided a method of a network node of a cellular radio access network enabled to communicate with a communication device enabled for cellular communication and device-to-device (D2D) communication. The method comprises determining information about a rate on which the communication device is expected to perform cell search when out-of-coverage in relation to the cellular radio access network and transmitting the information about the rate to the communication device. The information comprises at least one of information about a first rate to the communication device on which the communication device is expected to perform cell search when out-of-coverage in relation to the cellular radio access network and no D2D operation is ongoing or imminent, and information about a second rate to the communication device on which the communication device is expected to perform cell search when out-of-coverage in relation to the cellular radio access network and D2D operation is ongoing or imminent.

The D2D operation may be any one or more of D2D transmission, D2D reception, Proximity service (ProSe) direct communication, and ProSe direct discovery.

The relation between the first rate and the second rate may be such that the second rate is higher than the first rate by a scaling factor. The method may comprise transmitting the scaling factor to the communication device.

The information about the first and second rates may comprise the second rate, and a scaling factor for a relation between the first rate and the second rate wherein the second rate is higher than the first rate by the scaling factor. The scaling factor may be given by a function defining how a kind or type of D2D operation activity of the ongoing or imminent D2D operation is assigned in relation to that kind or type. The function may for example be a mapping. The function may be such that, when the kind of D2D operation activity of the ongoing or imminent D2D operation is a discovery signalling, the scaling factor is based on a periodicity of the discovery signalling.

According to an eighth aspect, there is provided a network node of a cellular radio access network enabled to communicate with a communication device enabled for cellular communication and device-to-device, D2D, communication. The network node comprises a controller, and a transmitter. The controller and transmitter are arranged to determine and transmit out-of-coverage parameters regarding cell search for the communication device according to the seventh aspect.

According to a ninth aspect, there is provided a computer program comprising instructions which, when executed by a processor of a network node, causes the network node to perform the method according to the seventh aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings.

DETAILED DESCRIPTION

D2D operation in out of network coverage (ONC) or out-of-coverage (OoC) is a new scenario where a D2D UE may operate also when no access network coverage is present. An example is a UE used for public safety which should be able to communicate directly with other public safety UEs also when no access network coverage is present. D2D UEs can be pre-configured with ProSe resources that the UEs use when they are out of network coverage. Examples of ProSe resources are ProSe subframes, time slots, physical channels such as resource blocks within ProSe subframes or time slots etc. These pre-configured resources are intended to be used only in an out of network coverage scenario. If they are used inside the cells of the cellular network or in close proximity of those cells. D2D UEs may cause interference and harm the cellular communication in the cells. To further minimize interference during ProSe operation in an ONC or OoC scenario, the D2D UEs can further be configured with one or more parameters associated with the pre-configured ProSe resources. These parameters ensure that UE operates with reduced power and lowers emissions in carriers outside that of the side link. Examples of these parameters associated with ProSe resource parameters are P-Max-ProSe and additionalSpectrumEmissions-ProSe. Here, P-Max-ProSe is a parameter defining the maximum power of ProSe transmissions when operating out-of-coverage, and the parameter additionalSpectrumEmissions-ProSe is used by the D2D UE to adjust its transmission to meet region-specific regulatory emission requirements when the D2D UE is operating out-of-coverage. D2D UE behaviour on how the pre-configured ProSe resources shall be controlled when a new cell has been detected is not defined. Due to lack of specified UE behaviour and corresponding performance requirements, the use of ProSe resources by the D2D UE when it enters inside the network coverage may cause interference to the WAN i.e. where one or more WAN cells are operating and can receive signals from the D2D UE. Hence a ProSe UE using D2D transmission in out of coverage needs to quickly detect whether it comes into coverage of a network (NW) node, hence cell search needs to be performed often.

However doing cell searches too often is costly in terms of power and battery life and hence it is not desirable to have "always on" approach w.r.t cell search all the time when the UE is out-of-coverage. Therefore there is a need for an approach on how a D2D wireless communication device or ProSe UE should perform intra-frequency cell search when in an out of coverage scenario.

In this description the terms device, communication device, wireless device, UE, D2D device or ProSe UE may be used, but may in general be any device, sensor, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE. UE capable of machine to machine (M2M) communication, etc.

In some embodiments a generic terms "network node" or "controlling node" are used and it can correspond to any type of radio network node or any network node, which communicates with a wireless device (e.g. a ProSe UE or UE) and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), Cluster Head, relay, donor node controlling relay, base transceiver station (BTS), access point (AP), transmission points, transmission nodes, RRU, RRH, nodes in distributed antenna system (DAS), core network node (e.g. Mobile Switching Centre (MSC), Mobility Management Entity (MME), etc.), O&M, Operations and Support Systems (OSS), SON etc.

The communication device (e.g. a UE or ProSe UE or D2D device) is able to connect to a cellular system (LTE for instance) and may be able to direct communication to another ProSe UE (in a D2D communication) on a subset of the cellular system frequency resources (UL resources for instance). The resources for ProSe operation are used on an UL carrier (e.g. UL subframes on UL carrier) in FDD or half duplex FDD or on UL resources (e.g. UL subframes) in TDD. The cellular system is also interchangeably called a wireless access network (WAN) system.

Figure 1:
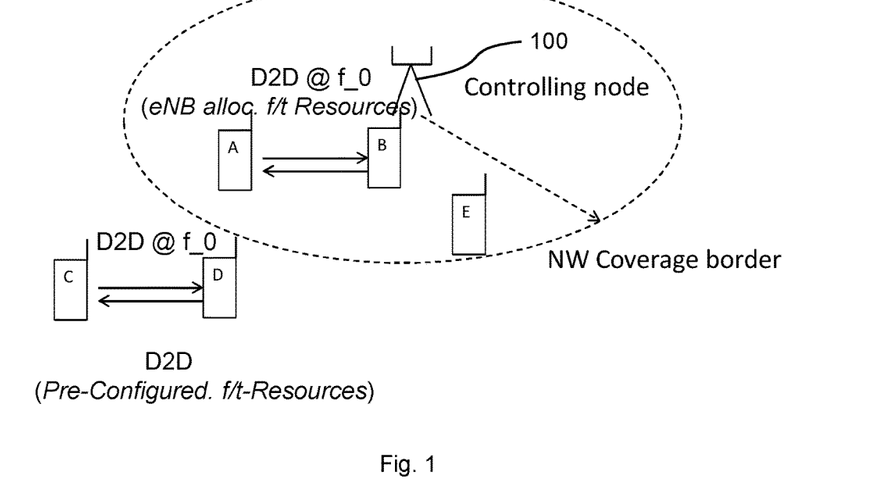
FIG. 1 schematically illustrates the principles for D2D communication within LTE.

FIG. 1 shows the principles for D2D communication within LTE. Although LTE is shown for this embodiment, other embodiments may work with other wireless technologies. A controlling node 100, i.e. eNode B or Cluster Head, is controlling the communication on a frequency carrier f_0. In a first scenario, devices A and B are communicating directly via a D2D link, and both devices are inside NW coverage of the controlling node. The controlling node then allocates the radio resources to use for D2D communication. In the second scenario devices C and D may have D2D communication outside coverage of a controlling node. In this case the D2D communication is using pre-configured (e.g. by a standard specification, or by device capabilities) frequency/time (f/t)-resources for D2D communication. Since the pre-configured resources may be used by other devices inside controlling node coverage, for example a device E which is communicating with the controlling node, the D2D communication between devices C and D may start to interfere with the communication between device E and the controlling node, if devices C and D are coming into the controlling node coverage. It is thus also desired that a device can detect in a controlled way whether it is coming inside network coverage, in order to minimize the risk for interference.

In order to know whether the device is In (network) Coverage (IC) or Out of (network) Coverage (OoC), the device may have a physical layer metric in order to determine the coverage state, since different procedures and protocols are defined for transmission of a discovery beacon, i.e. for D2D discovery, and D2D communication when IC and OoC, i.e. start D2D operation or transmission without a grant from the controlling node. A D2D operation may be any one or more of D2D transmission, D2D reception, Proximity service (ProSe) direct communication and Proximity service (ProSe) direct discovery. The ProSe direct communication may further comprise transmission and/or reception of signals related to ProSe.

In LTE, devices in RRC_connected mode, i.e. in active mode, and served by a controlling node such as an eNodeB, are required to do Radio Link Monitoring (RLM) on the physical layer in order to detect whether the device is in-synchronization (in-sync) or out-of-synchronization (out-of-sync) with respect to the serving cell. RLM is performed using Down-Link (DL) Common Reference Signals (CRS) and based on an estimated Signal-to-Interference Ratio (SIR) which is mapped to a hypothetical Physical Downlink Control CHannel (PDCCH) BLER. The mapping may be a function of antenna and system bandwidth configurations. Based on the estimated PDCCH BLER, the device determines in-sync or out-of-sync on the physical layer, which determination then is reported to higher layer for further action. If Radio Link Failure (RLF) is declared at the higher layer, the device then returns to idle mode (e.g. RRC_IDLE state). The RLM is used for several purposes, for instance detection of whether the device goes out of network coverage, but also gives a controlled way for the device to go back to idle mode (e.g. RRC_IDLE state) in case synchronization is lost, due to some internal device sync problem, or due to, for instance, a failure of a handover process (between two controlling nodes). In the latter two cases, the RLF declaration is made even if the device still may be inside network coverage.

A first approach may be to try to reuse the RLM for D2D operation for detecting whether the device is IC or OoC. However, several problems may be envisioned by reusing this out-of-sync definition for OoC detection in relation to D2D communication, for instance:

1. In case of internal problem or malfunction of the device or a handover failure, the device need not to be in OoC even if RLF is declared, and hence, without proper OoC definition, the device may start using pre-configured D2D resources, which then may introduce significant interference within the cell.

2. The RLF is only defined in RRC_connected mode, hence a device OoC as well as in RRC_idle will not perform RLM.

3. A conventional LTE device may have an internal, specific NW coverage definition, in order to enable optimized cell search etc. in order to reduce the power consumption.

Hence, to avoid these problems there is a need to know whether a communication device is in IC or OoC. This may be inherent knowledge, e.g. from other processed of the communication device, or be determined. This issue is discussed for example in WO 2015/063185. In brief, WO 2015/063185 suggests that a physical layer metric should be determined based on at least one potentially received signal from a controlling node of the cellular radio access network, and based on the physical layer metric it should be determined whether the cellular communication device is in coverage or out of coverage of the controlling node. For example, a state or value associated with the metric may be considered, e.g. by comparing the value with a threshold and/or mapping the state to whether the cellular communication device is in coverage or out of coverage of the controlling node, wherein the physical layer metric may comprise a Random Access Response received from the controlling node, and the state associated with the metric comprises whether the Random Access Response is received or not. For example, the cellular communication device is determined to be in coverage of the controlling node if the Random Access Response was received within a predetermined number of Random Access attempts. The physical layer metric may alternatively comprise a synchronisation signal or a pilot signal received from the controlling node and filtered over a predetermined time, and the value associated with the metric may comprise a signal level or signal-to-noise-and-interference-ratio of the synchronisation signal or pilot signal, and the cellular communication device is determined to be in coverage of the controlling node if the signal level or signal-to-noise-and-interference-ratio is above the threshold. Another approach may be based on that the physical layer metric comprises a broadcast signal received from the controlling node, and the state associated with the metric comprises whether the broadcast signal is decodable or not, wherein the cellular communication device for example may be determined to be in coverage of the controlling node if the broadcast signal was able to be decoded within a predetermined time interval. Alternatively, the physical layer metric comprises a control channel received from the controlling node, and the state associated with the metric comprises whether the control channel is decodable or not.

Figure 2:
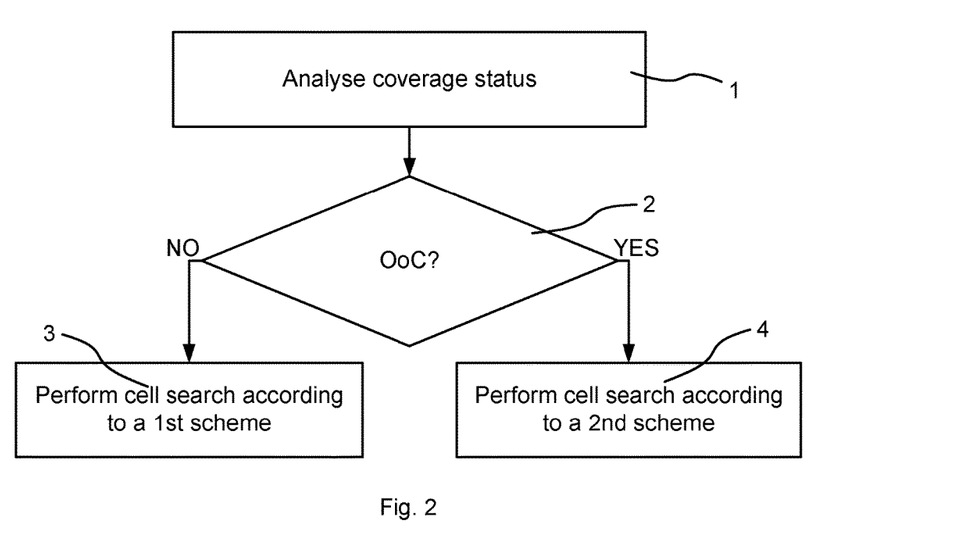
FIG. 2 is a flow chart illustrating a method according to an embodiment.

FIG. 2 is a flow chart illustrating a method of a communication device according to an embodiment. Coverage status of the communication device towards a network node, i.e. whether the device (e.g. a UE or ProSe UE) is in IC or OoC, is analysed or monitored 1, which may be performed as discussed above or will be discussed in greater detail below. Depending on the outcome of the analysis 1, it is determined 2 whether the device is considered to be OoC or not. If the device is not OoC, i.e. IC, cell search is performed 3 according to a first cell search scheme. This first cell search scheme may resemble or be equal to an ordinary cell search scheme for a device connected to or camping on a cell. If the device is determined to be in OoC, cell search is performed 4 according to a second cell search scheme. The second cell search scheme may be adapted, in view of the first cell search scheme, such that energy and/or power consumption is reduced in the device.

The first cell search scheme resembles and ordinary cell search scheme for a cellular communication device. Thus, the communication device regularly searches for cells, e.g. every 40 or 80 ms.

Figure 3:
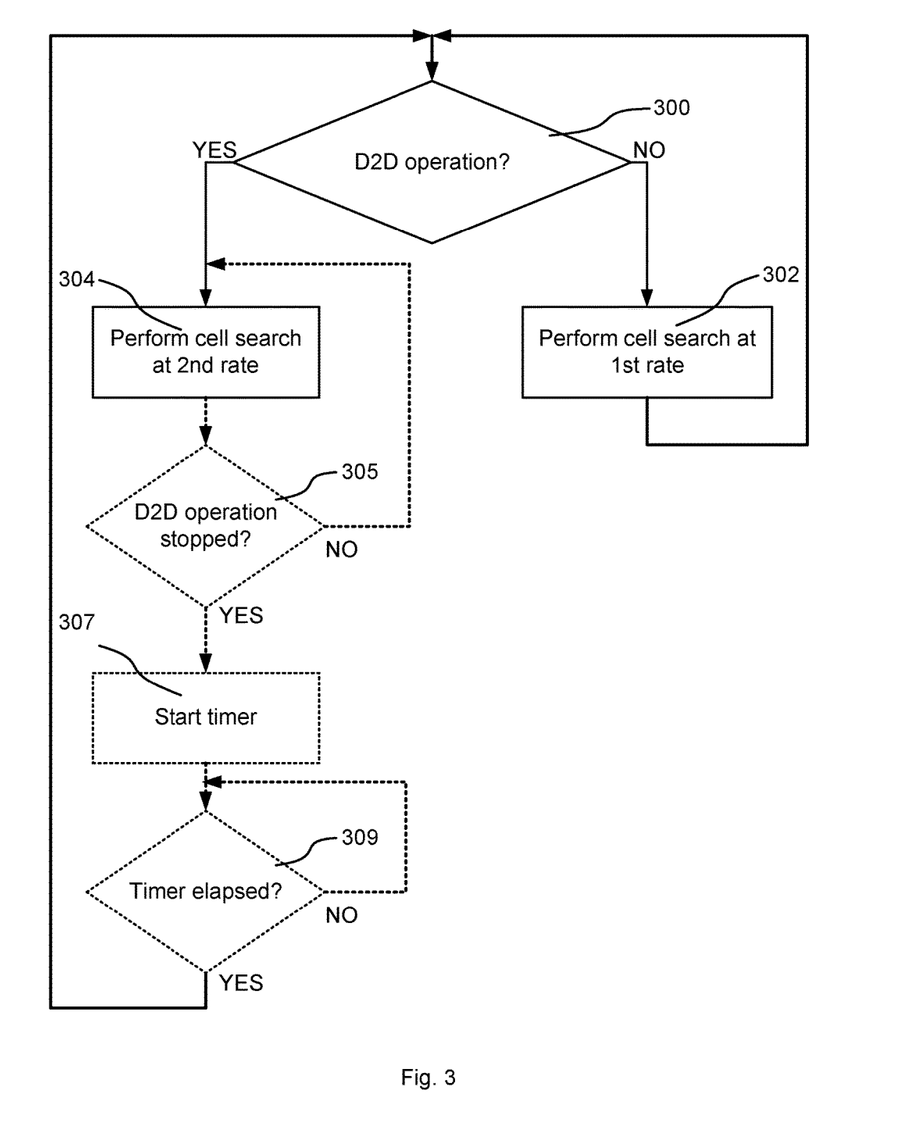
FIG. 3 is a flow chart illustrating procedures for the second cell search scheme according to an embodiment.

FIG. 3 is a flow chart illustrating procedures for the second cell search scheme. It is to be noted that the OoC monitoring procedure as demonstrated with reference to FIG. 2 may be running in parallel, i.e. according to a real-time principle, wherein the procedure demonstrated here with reference to FIG. 3 may be interrupted and a switch to the first cell search scheme may be made, e.g. based on the outcome of cell search and its processing, may be made anywhere in the procedure illustrated in FIG. 3.

Since FIG. 3 illustrates procedures according to the second cell search scheme, it is assumed that the device (e.g. a UE or ProSe UE) is considered to be OoC. The communication device determines 300 whether a D2D operation is ongoing or imminent. This is given by inherent knowledge at the communication device of D2D traffic. If no D2D operation is ongoing or imminent, the device will perform 302 cell search at a first rate. The rate is how often the device will attempt to detect a new cell. For example, a rate of one cell detection attempt per 40 ms means that device will attempt to detect a new cell once every 40 ms. This first rate will be arranged to be below a threshold (e.g. below one attempt per 100 ms) to save energy and/or power, as will be further discussed below. If a D2D operation is ongoing or imminent, the device will perform 304 a cell search at a second rate. The second rate may be higher than the first rate, and since communication is or will be ongoing anyway, there is not as much energy or power to save to keep the second rate low. The energy saving is mainly achieved by keeping the first rate low in comparison to the second rate.

Figure 4:
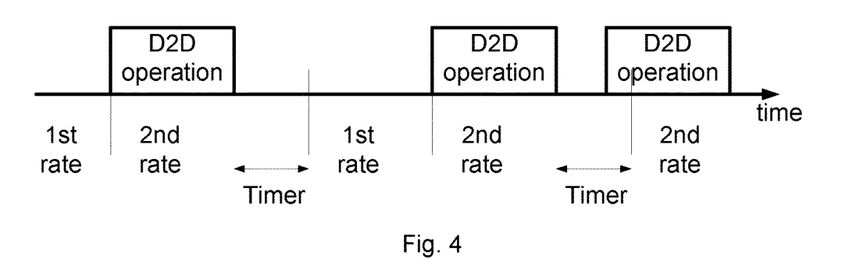
FIG. 4 illustrates a time line and events according to an example.

The approach for the second cell search scheme demonstrated above will be running as the device is in OoC. However, at intermittent D2D traffic being fairly intensive, there may be frequent shifts between the first and second rates. To avoid such ping-pong effect, the procedure may optionally include checking 305 whether a D2D operation has stopped or halted. If not, i.e. the D2D communication is still ongoing, the cell search continues using the second rate and the monitoring 305 whether a D2D operation has stopped or halted goes on. If the D2D communication has stopped or halted, a timer may be started 307 and the procedure continues performing cell search at the second rate until the timer has elapsed 309. Then the procedure returns to the checking 300 whether a D2D operation is ongoing or imminent, and so on. By this optional approach, some hysteresis is formed such that switching to the first cell search rate for very short intermediate periods is avoided. FIG. 4 illustrates how this may work.

FIG. 4 illustrates a time line and events in OoC according to an example. FIG. 4 illustrates a time line with D2D operations indicated at the top of the time line, and the cell search rates is indicated below the time line. At first, in this example, the device performs cell search at the first rate. Then, as a D2D operation starts, the device changes to perform cell search at the second rate. When the D2D operation ends, the timer starts and when the timer has elapsed it is checked whether a D2D operation is ongoing or imminent. In the example of FIG. 4 it is not, and the device changes to perform cell search at the first rate. After a while, D2D operations start again, and the device changes to performing cell search at the second rate. When this D2D operation ends, the timer is started again and when the timer has elapsed, it is again checked whether a D2D operation is ongoing or imminent. Here, when the timer is on, there is an ongoing D2D operation, and the device continues to make cell search at the second rate. Thus, the first rate may correspond to that the communication device identifies a cell within the first time period and the second rate may correspond to that the communication device identifies a cell within the second time period, where the first time period may be larger than the second time period. For example, the first time period may be in the magnitude of 30 seconds and the second time period may be in the magnitude of 5 seconds.

An advantage is thus power saving by the applied first and second rates, as demonstrated above. A particular advantage of this power saving is realized when considering for example the application to for example public safety UEs.

A device, such as a D2D capable device (D2D device or D2D UE), may monitor whether the device is in-coverage or out of coverage w.r.t to a serving cell using a frequency band supporting D2D communication, with respect to which cell (i.e. the serving cell) the device is out of coverage. The OoC may also interchangeably be called as out-of-network coverage (ONC), out of WAN coverage, out of cellular coverage, any cell selection state etc. The OoC or any cell selection state may be a type of RRC state where the UE can be preconfigured to perform D2D operation on a side link of a preconfigured carrier. In this scenario, D2D devices communicating with each other are not under network coverage. Therefore the D2D devices in OoC cannot receive signals from and/or transmit signals to any network node in the network. Typically the lack of coverage is due to complete absence of the network coverage in the vicinity of the D2D devices, due to which the D2D devices cannot use timing and frequency synchronization based on signals from any cell in the network.

The monitoring may be performed by the device by doing cell search on a cell on a DL carrier or DL resources used for that frequency band according to one or more existing procedures or device implementation e.g. by correlating the received PSS/SSS signals with their pre-defined values in LTE.

The device (e.g. UE) coverage status (e.g. OoC or IC) with respect to a cell (e.g. current serving cell) may be determined by the device by comparing a signal measurement (e.g. RSRP in LTE) with one or more thresholds. The device may also compare a plurality of signal measurements (e.g. RSRP, SINR. BLER, SNR, RSRQ, CQI etc in LTE) performed by the device with their respective thresholds for determining in coverage or OoC status of the device with respect to its serving cell. In certain embodiments, for example, the out of network coverage (OoC) may be determined by the device when the signal measurement (e.g. RSRP in LTE) indicates a received signal level below a first threshold that may correspond to a possibility for reliable detection of broadcast information and/or or certain control channels e.g. PDCCH in LTE systems. In other embodiments, the OoC is determined based on whether broadcast information (MIB and D2D relevant SIBs) transmitting in one or more broadcast channels (e.g. Physical Broadcast CHannel (PBCH), Physical Downlink Shared Channel (PDSCH), etc.) may be possible to be reliably detected. The device may assume that the information is reliably detected if the signal quality of the channels is within an acceptable range (e.g. BER or BLER is below a BER/BLER threshold, SNR is above SNR threshold etc). In yet another embodiment, the OoC status of the device is detected based on not receiving any network response, which sometimes is referred to as random access response (RAR) on Random Access transmissions by the device. Another approach for a device determining whether it is OoC is also disclosed in WO2015/063185, as discussed above.

In case a control unit in the device indicates in-coverage, the device may be considered to be in NW coverage and hence cell search may be performed according to a first cell search scheme at a rate, i.e. how often information, for determining information about the cell should be received and processed. The first cell search scheme may use a cell search scheme according to an ordinary scheme for devices being connected to or camping on a cell, as discussed above. For instance, if the wireless device is in idle mode, cell search is made, i.e. a new cell is tried to be detected, according to a rate such that a new cell can be detected within 32 seconds for a DRX cycle of 1.28 seconds.

In case the control unit determines that the wireless device is OoC, according to one or more metrics and/or requirements or conditions as discussed above, the device performs cell search on a cell belonging to a first carrier, associated with a second carrier carrying UL resources (one or more side-links) used for D2D operation (e.g. D2D communication and/or D2D discovery) according to a first rate. The cell search rate or cell detection rate herein means how often the wireless device performs cell search, e.g. how often the wireless device performs correlation over the received synchronization signals (e.g. PSS/SSS) with one or more pre-defined synchronization sequences. The second carrier may be the same as the first carrier, for example in TDD, or in case of FDD or half duplex FDD it may be an UL carrier and first carrier a DL carrier. The first rate may be similar to the rate needed in case the UE is in-coverage and in RRC idle mode. As an example the UE may detect the cell on the first carrier once every DRX cycle or with a rate such that a new cell becoming stronger than a threshold, for instance SINR of −6 dB (aka ratio of received energy to total received interference and noise (Es/Iot) of −6 dB), should be detected and verified via RSRP measurements within 32 seconds assuming DRX cycle of 1.28 seconds. The embodiments herein cover also other first rates as well as detection requirements e.g. time to detect the cell using the first rate. The requirements can be specified in a standard.

The first rate may be explicitly pre-defined, e.g. to perform search cell once every second or once every DRX cycle, or it may be implicitly pre-defined to be corresponding to the rate in RRC idle state or in connected state for certain DRX cycle, e.g. DRX cycle of 1.28 s, or it may also be preconfigured by a network node, e.g. by previous serving cell and information of the rate is transmitted from the network node to the communication device.

A processing element or control unit in the device continuously monitors whether the device is going to initiate, enable or start D2D operations e.g. D2D transmissions, or knows that such D2D operations are ongoing. As long as no D2D operation, e.g. D2D transmission, is started, the device continues to do cell search on the first carrier. The wireless device determines if it is performing or will start D2D operation or transmission in one or more of several ways based on one or more estimations or measurements. Example embodiments may be that the wireless device determines D2D activity, i.e. that D2D operation is ongoing or imminent, if a buffer containing D2D data for transmission is non-empty or if a radio control unit enables the radio transmitter to start a D2D transmission or if the radio transmitter measures or detects that signals are being transmitted in any D2D resource, etc. Once such determination is made that there is D2D activity or D2D activity is expected to start on a side-link, then the wireless device performs cell search on a cell on a first carrier, which is associated with a second carrier carrying UL resources. i.e. the so called side-link used for D2D communication, according to a second rate.

The second rate may be similar to the rate needed in case of in-coverage active mode, e.g. for RRC_connected in LTE, i.e. every 40 ms, or with a rate such that a signal from a new cell becoming stronger than a first threshold, for instance −6 dB for Es/Iot, should be detected and verified via RSRP measurements within 800 ms. Other second rates as well as detection requirements are equally feasible. The control unit monitors the D2D operation and as long as there are ongoing D2D sessions the cell search continues to be performed according to the second rate. In some embodiments, once the D2D operation has stopped, the rate for cell search is changed back to the first rate. In other embodiments the change or transition back to the first rate is made after an inactivity timer has expired, which may be set to for example 1-5 seconds. The timer may be enabled once D2D operation has stopped/halted. A benefit of this is that ping-pong effects between transitions of first and second rates are avoided. In yet another embodiment the cell search at the second rate is continued also during D2D operation and the inactivity timer is enabled once the D2D operation is halted, and then a change to first rate is made once the timer expires.

The first and/or the second rates may also be explicitly pre-defined, e.g. to perform search cell once every 40 ms or once every DRX cycle, e.g. assuming DRX of 80 ms or shorter, or the rate(s) may be implicitly pre-defined to be corresponding to the cell search rate used by the device in connected state for certain DRX cycle, e.g. DRX cycle of 40 ms, or the rate(s) may also be preconfigured by a network node, e.g. by previous serving cell.

As an example, the first and the second rates may be defined such that the communication device is required to identify a cell: within X seconds based on the first rate when no D2D operation is ongoing or not imminent and within Y seconds based on the second rate when D2D operation is ongoing or imminent, where X is larger than Y. Examples of X and Y are 30 seconds and 5 seconds respectively. In another example, X and Y can be 20 seconds and 1 second respectively. In another example, the first and the second rates may be defined as being associated with first and second cell identification delays (aka cell detection delays, cell search delays etc.). The cell detection rate and the cell identification delay may be related. The cell identification delay is the time or duration over which the device identifies or detects a cell using a particular rate. For example when using the first rate the device will detect the cell during the first cell identification delay. Also for example when using the second rate the device will detect the cell during the second cell identification delay. These delays may be defined such that the communication device identifies a cell: within P seconds when no D2D operation is ongoing or not imminent, and within Q seconds when D2D operation is ongoing or imminent, where P is larger than Q.

In yet another example, the first rate (R1) and the second rate (R2) as well as the first (P) and the second (Q) cell identification delays may be pre-defined. The second rate and the first rate may be associated by a relation or a function, which may be pre-defined or configured by the network node, or it may be determined by the UE autonomously. Typically the second rate is higher than the first rate for detecting a cell on the first carrier. For example, a relation or function associating the second rate (R2) and the first rate (R1) may be expressed as:

$$R2=f(R1,\mu i), \qquad [1]$$

where µi is a scaling factor, which may be pre-defined or configured by the network node. The scaling factor, µi, may in turn be a function of for example a communication state of the D2D operations.

A specific example of the relation between the first and second rates is:

$$R2=\mu 1*R1, \qquad [2]$$

where µ1 is a scaling factor. Different values of the scaling factor may be applied in different situations or under different criteria such as speed of the device, frequency band of the carrier on which cell is to be detected, type of D2D operation, such as ProSe direction communication or direct discovery etc., e.g.

$$R2=\mu 2*R1 \text{ for one situation} \qquad [3]$$

$$R2=\mu 3*R1 \text{ for another situation, and} \qquad [4]$$

$$R2=\mu 4*R1 \text{ for still another situation.} \qquad [5]$$

The scaling factors may for example be determined by experimenting, e.g. performing simulations, for the different situations to tune operation, and/or by considering particulars of communication for the situation.

The second and the first cell identification delay (or cell detection delay, cell search delay etc.) may also be associated by a relation or a function, which may be pre-defined or configured by the network node, or it may be determined by the UE autonomously. The second cell identification delay may be shorter than the first cell identification delay for detecting a cell on the first carrier. For example, a relation or function associating the second rate cell identification delay (D2) and the first cell identification delay (D1) may be expressed as:

$$D2=f(D1,\beta i) \qquad [6]$$

where β1 is a scaling factor, which may be pre-defined or configured by the network node. The scaling factor, βi, may in turn be a function of for example, a communication state of the D2D operations. A specific example of the relation between the first and second cell identification delays is:

$$D2=\beta 1*D1 \qquad [7]$$

where β1 is a scaling factor. Different values of the scaling factor may be applied in different situations or under different criteria such as speed of the device, frequency band of the carrier on which cell is to be detected, type of D2D operation, such as ProSe direction communication or direct discovery etc, e.g.

$$D2=\beta 2*D1 \text{ for one situation} \qquad [8]$$

$$D2=\beta 3*D1 \text{ for another situation, and} \qquad [9]$$

$$D2=\beta 4*D1 \text{ for still another situation.} \qquad [10]$$

The relation between the first rate and the second rate or between the first and the second cell identification delays may also depend upon the type of D2D operation performed by the device or the D2D wireless device. One scaling factor (or function) may be used for general transmitting, another for general receiving, still another for discover signals, still further another for some special known transmission pattern, etc. The scaling factor for respective communication state may then be adapted such that the rates correspond to respective communication pattern wherein energy consumption may be further decreased. For example, for the case of discovery signals, the rates may be adapted to the periodicity of the discovery signals. For general transmitting and/or receiving, the scaling factor may for example be based on some statistics on previously performed operations.

The second carrier frequency on whose slide link the wireless device performs D2D operation in OoC may:
  be the carrier of the last serving cell before the wireless device entered in the OoC i.e. last or previous intra-frequency carrier; or
  it may be a separate carrier preconfigured with D2D resources for D2D operation in OoC. For example the carrier frequency, on which the device can perform D2D operation when the device goes in OoC (or any cell selection state), is preconfigured by the last serving cell. The preconfigured carrier can be the same carrier as the carrier of the last serving cell or it can be a different carrier frequency.

In case the wireless device is configured for D2D operations on side links of multiple carriers, e.g. on carriers for PCell, SCell, etc. in carrier aggregation, or last intra-frequency carrier and carrier configured for D2D operation in OoC, then the wireless device may also perform the cell search procedure when in OoC, as described above, to detect cells on all the carriers i.e. on the corresponding downlink carriers. In this case the wireless device may use the same sets of the first and second rates for detecting cells on all carriers. In another embodiment the wireless device may use different sets of the first and second rates for detecting cells on different carriers. The first and second rates and/or their relations may be pre-defined, configured by the network node and corresponding information transmitted to the device or autonomously decided by the wireless device.

In case the wireless device detects any cell on the first carrier frequency or on any carrier in case of multiple carriers, then the wireless device may stop performing D2D operation or stop performing a certain type of D2D operation e.g. stop transmitting D2D signals.

Figure 5:
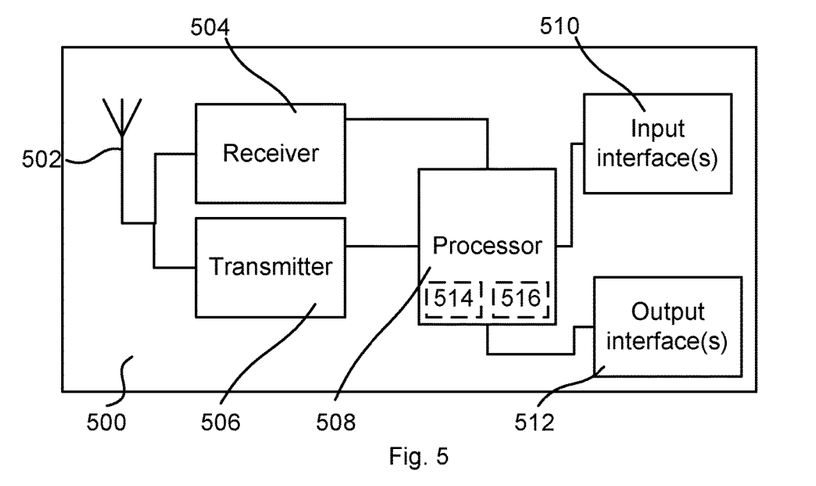
FIG. 5 is a block diagram schematically illustrating a device or communication device according to an embodiment.

FIG. 5 is a block diagram schematically illustrating a device or communication device 500 according to an embodiment. The communication device comprises or is associated with an antenna arrangement 502, a receiver 504 connected to the antenna arrangement 502, a transmitter 506 connected to the antenna arrangement 502, a processing element or controller 508 which may comprise one or more circuits, one or more input interfaces 510 and one or more output interfaces 512. The interfaces 510, 512 can be user interfaces and/or signal interfaces, e.g. electrical or optical. The communication device 500 is arranged to operate in a cellular communication network, as demonstrated above. In particular, by the processing element 508 being arranged to perform the embodiments demonstrated with reference to FIGS. 1 to 4, the communication device 500 is capable of communication within a 3GPP LTE network, and in particular LTE direct communication, i.e. D2D communication. The processing element 508 can also fulfil a multitude of tasks, ranging from signal processing to enable reception and transmission since it is connected to the receiver 504 and transmitter 506, executing applications, controlling the interfaces 510, 512, etc. In particular, the communication device 500 is arranged for operating with a cellular radio access network and enabled for device-to-device communication. The receiver 504 is arranged to receive at least one potential signal, i.e. a signal that might be received considering that we here discuss out-of-coverage, OoC, scenarios, from a controlling node of the cellular radio access network for performing cell search. The processing element 508 may implement one or more controllers arranged to determine whether the communication device 500 is in an OoC, state or in-coverage, IC, state with relation to the controlling node 100 and assign a scheme for the cell searching and perform a cell search according to what has been demonstrated above. Thus, the processing element 508 may be referred to as "a controller 508", as indicated above, when considering that functionality. The processing element 508 may comprise a determining unit 514 arranged to analyse a coverage status of the device and to determine whether the communication device 500 is in an out-of-coverage, OoC, state or in-coverage, IC, state with relation to the controlling node 100. The processing element may further comprise at least one cell search unit 516 arranged to assign a scheme for the cell searching and perform a cell search according to what has been demonstrated above.

Returning to FIG. 1, the controlling node 100 may be a network node of a cellular radio access network enabled to communicate with the communication devices which may be enabled for cellular communication and device-to-device, D2D, communication. The network node comprises a controller, and a transmitter. The controller and transmitter are arranged to determine and transmit out-of-coverage parameters regarding cell search for the communication device. The determination and transmitting may comprise information about the first rate preconfigured by the radio access network to the communication device on which the communication device is expected to perform cell search when out-of-coverage and no D2D operation (e.g. a transmission) is ongoing or imminent. The determination and transmitting may also comprise information about the second rate preconfigured by the radio access network to the communication device on which the communication device is expected to perform cell search when out-of-coverage and D2D operation is ongoing or imminent. The information about the first and second rates may be provided such that it comprises the second rate and a scaling factor for a relation between the first rate and the second rate wherein the second rate is higher than the first rate by the scaling factor. The scaling factor may be given by a function defining how a kind or type of D2D operation activity of the ongoing or imminent D2D operation is assigned in relation to that kind or type. The function may for example be a mapping. The function may for example be such that, when the kind of D2D operation activity of the ongoing or imminent D2D operation is a discovery signalling, the scaling factor is based on a periodicity of the discovery signalling. Other functions, as demonstrated above, for adapting to the current D2D situation, may also be provided. By the scaling factor or scaling factor function, and information about one of the rates, the communication device may determine the rates to be used. A corresponding method for the network node, and a computer program for implementing the method in the network node are thus provided accordingly.

The methods disclosed herein may be suitable for implementation with aid of processing means, such as computers and/or processors, especially for the case where the processing element 508 demonstrated above comprises a processor handling cell search schemes. Therefore, there is provided computer programs, comprising instructions arranged to cause the processing means, processor, or computer to perform the steps of any of the methods according to any of the embodiments described above.

Figure 6:
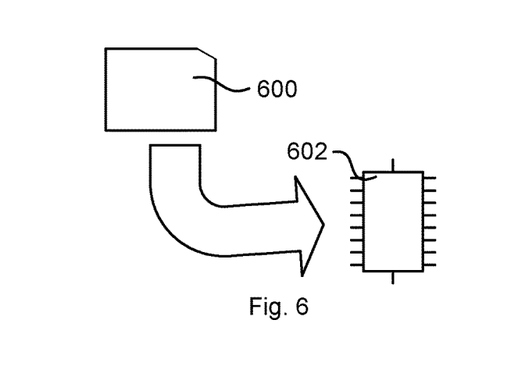
FIG. 6 schematically illustrates a computer-readable medium and a processing device.

FIG. 6 schematically illustrates a computer-readable medium and a processing device. The computer programs may comprise program code which is stored on a computer readable medium 600, as illustrated in FIG. 6, which can be loaded and executed by a processing means, processor, or computer 602 to cause it to perform the methods, respectively, according to embodiments of the present invention, preferably as any of the embodiments described above. The computer 602 and computer program product 600 can be arranged to execute the program code sequentially where actions of the any of the methods are performed stepwise. The processing means, processor, or computer 602 may be what normally is referred to as an embedded system Thus, the depicted computer readable medium 600 and computer 602 in FIG. 6 should be construed to be for illustrative purposes only to provide understanding of the principle, and not to be construed as any direct illustration of the elements. The illustration of FIG. 6 is applicable for computer program, computer readable-medium and processing device for both the communication device and the network node according to different embodiments demonstrated herein.

Figure 7:
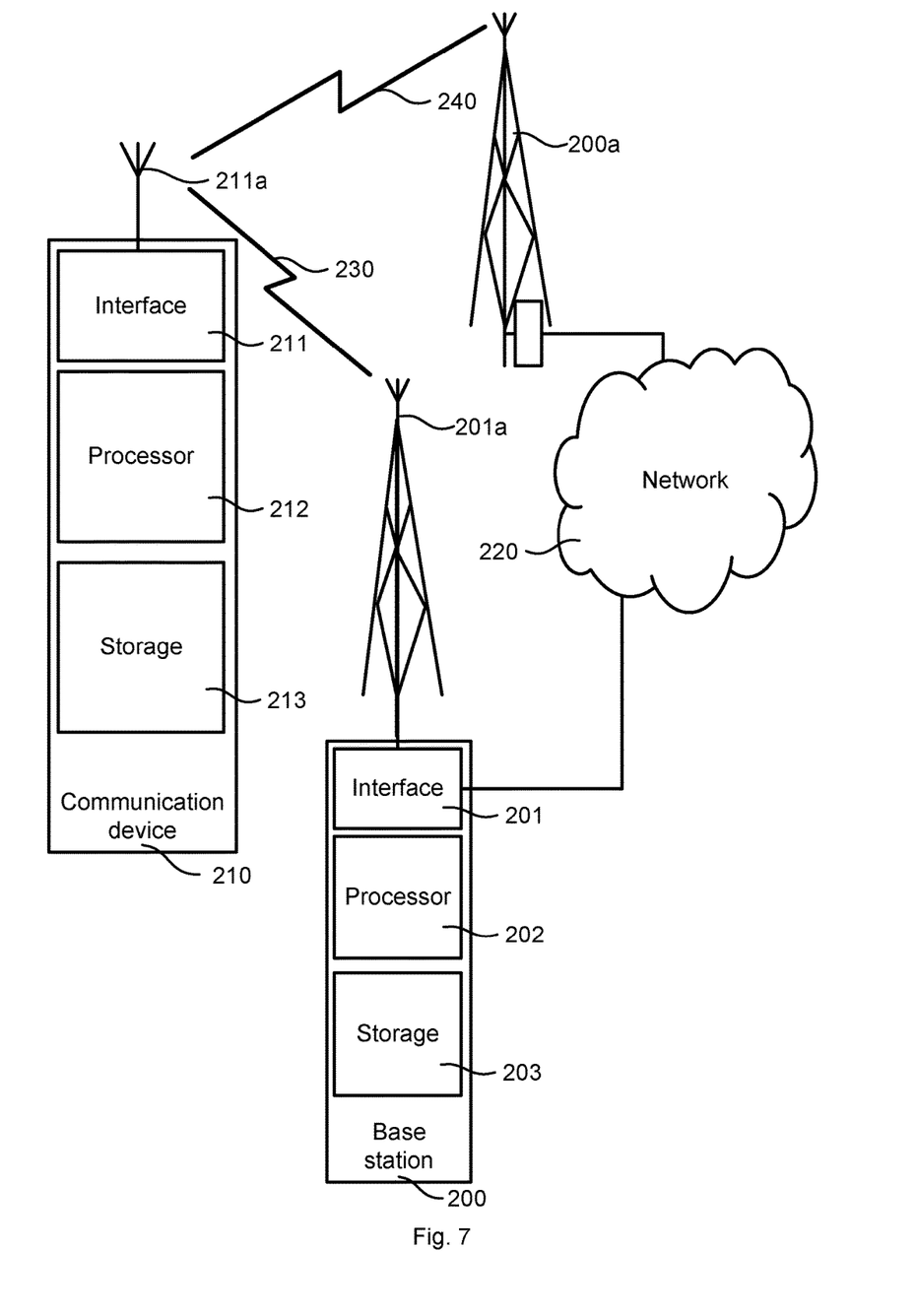
FIG. 7 illustrates a wireless network comprising a network node and a communication device.

FIG. 7 illustrates a wireless network comprising a more detailed view of a network node 200 and a communication device 210, in accordance with a particular embodiment. For simplicity, FIG. 7 only depicts network 220, network nodes 200 and 200a, and communication device 210. Network node 200 comprises processor 202, storage 203, interface 201, and antenna 201a. Similarly, the communication device 210 comprises processor 212, storage 213, interface 211 and antenna 211a. These components may work together in order to provide network node and/or wireless device functionality. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 200 comprises processor 202, storage 203, interface 201, and antenna 201a. These components are depicted as single boxes located within a single larger box. In practice however, a network node may comprises multiple different physical components that make up a single illustrated component (e.g., interface 201 may comprise terminals for coupling wires for a wired connection and a radio transceiver for a wireless connection). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless devices, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 210 may be any type of communication device, wireless device, UE, D2D device or ProSe UE, but may in general be any device, sensor, smart phone, modem, laptop. Personal Digital Assistant (PDA), tablet, mobile terminal, smart phone, laptop embedded equipped (LEE), laptop mounted equipment (LME), Universal Serial Bus (USB) dongles, machine type UE, UE capable of machine to machine (M2M) communication, etc., which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

In some embodiments, the components described above may be used to implement one or more functional modules used in D2D communication. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any features or functions disclosed herein. The modules may further be configured to perform other functions or steps not explicitly described herein but which would be within the knowledge of a person skilled in the art.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method of a communication device configured for cellular communication and device-to-device, D2D, operation and operating in an out-of-coverage, OoC, state, the method comprising:
   determining whether a D2D operation is one of ongoing and imminent;
   performing cell search according to a first rate when no D2D operation is one of ongoing and imminent; and
   performing cell search according to a second rate when D2D operation is one of ongoing and imminent, the relation between the first rate and the second rate being such that the second rate is higher than the first rate by a scaling factor.

2. The method of claim 1, wherein the first rate and the second rate define how often information about a cell to be searched should be received and processed by the communication device.

3. The method of claim 1, further comprising, upon determining that the D2D operation is ongoing:
   determining when the D2D operation stops;
   starting a timer; and
   when the timer has elapsed, returning to the determining whether a D2D operation is one of ongoing and imminent.

4. The method of claim 1, wherein the second rate corresponds to any of:
- a cell search rate used in an in-coverage, IC, state;
- a discontinuous reception, DRX, cycle; and
- a rate preconfigured by the radio access network.

5. The method of claim 1, wherein the out of coverage state comprises 'any cell selection state'.

6. The method of claim 5, wherein the 'any cell selection state' is a type of radio resource control, RRC, state where the communication device is preconfigurable to perform D2D operation on a side link of a preconfigured carrier.

7. The method of claim 1, wherein D2D operation is at least one of:
- D2D transmission;
- D2D reception;
- Proximity service, ProSe, direct communication; and
- ProSe direct discovery.

8. A method of a communication device configured for cellular communication and device-to-device, D2D, operation and operating in an out-of-coverage, OoC, state, the method comprising:
- determining whether a D2D operation is one of ongoing and imminent;
- performing cell search according to a first rate when no D2D operation is one of ongoing and imminent; and
- performing cell search according to a second rate when D2D operation is one of ongoing and imminent, the first rate allows the communication device to identify a cell within a first time period and the second rate allows the communication device to identify a cell within a second time period, where the first time period is larger than the second time period.

9. The method of claim 8, wherein a time period where the communication device identifies the cell within one of the first and second time period is defined as a cell identification delay.

10. A method of a communication device configured for cellular communication and device-to-device, D2D, operation and operating in an out-of-coverage, OoC, state, the method comprising:
- determining whether a D2D operation is one of ongoing and imminent;
- performing cell search according to a first rate when no D2D operation is one of ongoing and imminent; and
- performing cell search according to a second rate when D2D operation is one of ongoing and imminent, the first rate and the second rate being used to search a cell within a time duration equal to a first cell identification delay and a second cell identification delay, respectively.

11. A communication device for operating with a cellular radio access network and configured for device-to-device operation, the communication device comprising:
- a receiver configured to receive at least one signal from a controlling node of the cellular radio access network for performing cell search; and
- a controller configured to, when the communication device is in an out-of coverage, OoC, state with relation to the controlling node, assign a scheme for the cell searching such that the communication device is configured to perform cell search according to a cell search scheme where the controller is arranged to determine whether a D2D operation is one of ongoing and imminent, wherein the communication device is arranged to perform the cell search at a first rate when no D2D operation is one of ongoing and imminent, and to perform the cell search at a second rate when D2D operation is one of ongoing and imminent, the relation between the first rate and the second rate being such that the second rate is higher than the first rate by a scaling factor.

12. The communication device of claim 11, wherein the first rate and the second rate define how often information about a cell to be searched should be received and processed.

13. The communication device of claim 11, wherein the controller is configured to, upon determination that the D2D operation is ongoing:
- determine when the D2D operation stops;
- start a timer; and
- when the timer has elapsed, return to determine whether a D2D operation is one of ongoing and imminent.

14. The communication device of claim 11, wherein the second rate corresponds to any of:
- a cell search rate used in an in-coverage, IC, state;
- a discontinuous reception, DRX, cycle; and
- a rate preconfigured by the radio access network.

15. The communication device of claim 11, wherein the out of coverage state comprises 'any cell selection state'.

16. The communication device of claim 15, wherein the 'any cell selection state' is a type of radio resource control, RRC, state where the communication device is preconfigurable to perform D2D operation on a side link of a preconfigured carrier.

17. The communication device of claim 11, wherein D2D operation is at least one of:
- D2D transmission;
- D2D reception;
- Proximity service, ProSe, direct communication; and
- ProSe direct discovery.

18. A communication device for operating with a cellular radio access network and configured for device-to-device operation, the communication device comprising:
- a receiver configured to receive at least one signal from a controlling node of the cellular radio access network for performing cell search; and
- a controller configured to, when the communication device is in an out-of coverage, OoC, state with relation to the controlling node, assign a scheme for the cell searching such that the communication device is configured to perform cell search according to a cell search scheme where the controller is arranged to determine whether a D2D operation is one of ongoing and imminent, wherein the communication device is arranged to perform the cell search at a first rate when no D2D operation is one of ongoing and imminent, and to perform the cell search at a second rate when D2D operation is one of ongoing and imminent, the first rate allows the communication device to identify a cell within a first time period and the second rate allows the communication device to identify a cell within a second time period, where the first time period is larger than the second time period.

19. The communication device of claim 18, wherein a time period where the communication device identifies the cell within one of the first and second time period is defined as a cell identification delay.

20. A communication device for operating with a cellular radio access network and configured for device-to-device operation, the communication device comprising:
- a receiver configured to receive at least one signal from a controlling node of the cellular radio access network for performing cell search; and
- a controller configured to, when the communication device is in an out-of coverage, OoC, state with relation to the controlling node, assign a scheme for the cell searching such that the communication device is configured to perform cell search according to a cell search scheme where the controller is arranged to determine whether a D2D operation is one of ongoing and imminent, wherein the communication device is arranged to perform the cell search at a first rate when no D2D operation is one of ongoing and imminent, and to perform the cell search at a second rate when D2D operation is one of ongoing and imminent, the first rate and the second rate being used to search a cell within a time duration equal to a first cell identification delay and a second cell identification delay, respectively.

21. A method of a communication device configured for cellular communication and device-to-device, D2D, operation, the method comprising:
   determining at the communication device, whether the communication device is in one of an out-of-coverage, OoC, state and in-coverage, IC, state in relation to a cellular radio access network;
   performing cell search, when the communication device is in the IC state, according to a first cell search scheme; and
   performing cell search, when the communication device is in the OoC state, according to a second cell search scheme, performing the second cell search scheme comprising:
      determining whether a D2D operation is one of ongoing and imminent;
      performing the cell search at a first rate when no D2D operation is one of ongoing and imminent; and
      performing the cell search at a second rate when D2D operation is one of ongoing and imminent, the first rate and the second rate being used to search a cell within a time duration equal to a first cell identification delay and a second cell identification delay, respectively.

22. The method of claim 21, wherein the first rate and the second rate define how often information about a cell to be searched should be received and processed.

23. The method of claim 22, wherein the first rate allows the communication device to identify a cell within a first time period and the second rate allows the communication device to identify a cell within a second time period, where the first time period is larger than the second time period.

24. The method of claim 23, wherein a time period where the communication device identifies the cell within one of the first and second time period is defined as a cell identification delay.

25. The method of claim 21, further comprising, when it has been determined that the D2D operation is ongoing:
   determining when the D2D operation stops;
   starting a timer; and
   when the timer has elapsed, returning to the determining whether a D2D operation is one of ongoing and imminent.

26. The method of claim 21, wherein the second rate corresponds to any of:
   a cell search rate used in the IC state;
   a discontinuous reception, DRX, cycle; and
   a rate preconfigured by the radio access network.

27. The method of claim 21, wherein the out of coverage state comprises 'any cell selection state'.

28. The method of claim 27, wherein the 'any cell selection state' is a type of radio resource control, RRC, state where the communication device is preconfigurable to perform D2D operation on a side link of a preconfigured carrier.

29. The method of claim 21, wherein D2D operation is at least one of:
   D2D transmission;
   D2D reception;
   Proximity service, ProSe, direct communication; and
   ProSe direct discovery.

30. The method of claim 21, wherein the first cell search scheme comprises performing a cell search attempt at least one time per 100 ms.

31. A method of a communication device configured for cellular communication and device-to-device, D2D, operation, the method comprising:
   determining at the communication device, whether the communication device is in one of an out-of-coverage, OoC, state and in-coverage, IC, state in relation to a cellular radio access network;
   performing cell search, when the communication device is in the IC state, according to a first cell search scheme; and
   performing cell search, when the communication device is in the OoC state, according to a second cell search scheme, performing the second cell search scheme comprising:
      determining whether a D2D operation is one of ongoing and imminent;
      performing the cell search at a first rate when no D2D operation is one of ongoing and imminent; and
      performing the cell search at a second rate when D2D operation is one of ongoing and imminent, the relation between the first rate and the second rate being such that the second rate is higher than the first rate by a scaling factor.

32. A method of a communication device configured for cellular communication and device-to-device, D2D, operation, the method comprising:
   determining at the communication device, whether the communication device is in one of an out-of-coverage, OoC, state and in-coverage, IC, state in relation to a cellular radio access network;
   performing cell search, when the communication device is in the IC state, according to a first cell search scheme; and
   performing cell search, when the communication device is in the OoC state, according to a second cell search scheme, the determining at the communication device whether the communication device is in one of an out-of-coverage, OoC, state and in-coverage, IC, state in relation to the cellular radio access network comprising:
      determining a physical layer metric based on at least one received signal from the controlling node of the cellular radio access network; and
      determining whether the cellular communication device is one of in coverage and out of coverage of the controlling node based on the physical layer metric.

33. A communication device for operating with a cellular radio access network and configured for device-to-device operation, the communication device comprising:
   a receiver configured to receive at least one signal from a controlling node of the cellular radio access network for performing cell search; and
   a controller configured to determine whether the communication device is in one of an out-of-coverage, OoC, state and in-coverage, IC, state with relation to the controlling node, and assign a scheme for performing the cell search such that the communication device is configured to perform cell search, when the communication device is in the IC state, according to a first cell search scheme, and to perform cell search, when the communication device is in the OoC state, according to a second cell search scheme, the controller is configured to, upon performing the second cell search scheme, determine whether a D2D operation is one of ongoing and imminent, the communication device being arranged to perform the cell search at a first rate when no D2D operation is one of ongoing and imminent, and to perform the cell search at a second rate when D2D operation is one of ongoing and imminent, the first rate and the second rate being configured to be used to search a cell within a time duration equal to a first cell identification delay and a second cell identification delay, respectively.

34. The communication device of claim 33, wherein the controller is configured to, upon performing the second cell search scheme, determine whether a D2D operation is one of ongoing and imminent, wherein the communication device is arranged to perform the cell search at a first rate when no D2D operation is one of ongoing and imminent, and to perform the cell search at a second rate when D2D operation is one of ongoing and imminent.

35. The communication device of claim 34, wherein the first rate and the second rate define how often information about a cell to be searched should be received and processed.

36. The communication device of claim 35, wherein the first rate allows the communication device to identify a cell within a first time period and the second rate allows the communication device to identify a cell within a second time period, where the first time period is larger than the second time period.

37. The communication device of claim 36, wherein a time period where the communication device identifies the cell within one of the first and second time period is defined as a cell identification delay.

38. The communication device of claim 33, wherein the controller is further configured to, upon determination that the D2D operation is ongoing, determine when the D2D operation stops, start a timer, and, when the timer has elapsed, repeat the determination whether a D2D operation is one of ongoing and imminent.

39. The communication device of claim 33, wherein the controller is configured to determine whether the communication device is in one of the out-of-coverage, OoC, state and in-coverage, IC, state in relation to the cellular radio access network by being configured to determine a physical layer metric based on at least one received signal from the controlling node of the cellular radio access network; and
determine whether the cellular communication device is one of in coverage and out of coverage of the controlling node based on the physical layer metric.

40. The communication device of claim 33, wherein the first cell search scheme comprises performing a cell search attempt at least one time per 100 ms.

41. A communication device for operating with a cellular radio access network and configured for device-to-device operation, the communication device comprising:
a receiver configured to receive at least one signal from a controlling node of the cellular radio access network for performing cell search; and
a controller configured to determine whether the communication device is in one of an out-of-coverage, OoC, state and in-coverage, IC, state with relation to the controlling node, and assign a scheme for performing the cell search such that the communication device is configured to perform cell search, when the communication device is in the IC state, according to a first cell search scheme, and to perform cell search, when the communication device is in the OoC state, according to a second cell search scheme, the relation between the first rate and the second rate being such that the second rate is higher than the first rate by a scaling factor.

42. A method of a network node of a cellular radio access network configured to communicate with a communication device configured for cellular communication and device-to-device, D2D, operation, the method comprising:
determining information about a rate on which the communication device is expected to perform cell search when out-of-coverage in relation to the cellular radio access network; and
transmitting the information about the rate to the communication device, the information comprising at least one of:
information about a first rate to the communication device on which the communication device is expected to perform cell search when out-of-coverage in relation to the cellular radio access network and no D2D operation is one of ongoing and imminent; and
information about a second rate to the communication device on which the communication device is expected to perform cell search when out-of-coverage in relation to the cellular radio access network and D2D operation is one of ongoing and imminent, the relation between the first rate and the second rate being such that the second rate is higher than the first rate by a scaling factor.

43. The method of claim 42, wherein D2D operation is at least one of:
D2D transmission;
D2D reception;
Proximity service, ProSe, direct communication; and
ProSe direct discovery.

44. The method of claim 42, further comprising transmitting the scaling factor to the communication device.

* * * * *